US012160037B2

(12) United States Patent
Li et al.

(10) Patent No.: US 12,160,037 B2
(45) Date of Patent: Dec. 3, 2024

(54) WIRELESS EARSET

(71) Applicant: LUXSHARE PRECISION INDUSTRY COMPANY LIMITED, Shenzhen (CN)

(72) Inventors: WeiXiong Li, Shenzhen (CN); Yan Wang, Shenzhen (CN); JianWen Tian, Shenzhen (CN)

(73) Assignee: LUXSHARE PRECISION INDUSTRY COMPANY LIMITED, Shenzhen (CN)

( * ) Notice: Subject to any disclaimer, the term of this patent is extended or adjusted under 35 U.S.C. 154(b) by 230 days.

(21) Appl. No.: 18/087,178

(22) Filed: Dec. 22, 2022

(65) Prior Publication Data

US 2023/0387585 A1 Nov. 30, 2023

(30) Foreign Application Priority Data

May 31, 2022 (CN) ......................... 202210605992.5

(51) Int. Cl.

*H04R 5/02* (2006.01)
*H01Q 1/50* (2006.01)
*H04R 1/10* (2006.01)
*H04R 5/033* (2006.01)

(52) U.S. Cl.

CPC ............. *H01Q 1/50* (2013.01); *H04R 1/1041* (2013.01); *H04R 5/033* (2013.01)

(58) Field of Classification Search

CPC ......... H01Q 1/50; H04R 1/1041; H04R 5/033
USPC .................................................... 381/74, 309
See application file for complete search history.

(56) References Cited

U.S. PATENT DOCUMENTS

2023/0007378 A1* 1/2023 Zhang .................... H01Q 21/29

FOREIGN PATENT DOCUMENTS

| | | |
|---|---|---|
| CN | 104579375 A | 4/2015 |
| CN | 108599779 B | 3/2020 |
| CN | 110868757 A | 3/2020 |
| CN | 108512556 B | 6/2020 |
| TW | 201232917 A1 | 8/2012 |
| TW | 201830896 A | 8/2018 |

* cited by examiner

*Primary Examiner* — Ammar T Hamid
(74) *Attorney, Agent, or Firm* — Birch, Stewart, Kolasch & Birch, LLP

(57) ABSTRACT

Disclosed is a wireless earset, including an antenna, a plurality of pattern matching circuits, a radio frequency switch circuit, and a wireless chip. The radio frequency switch circuit is electrically connected to one pattern matching circuit based on a control signal, and grounds the connected pattern matching circuit. After the wireless earset is activated, the wireless chip outputs different control signals to control the radio frequency switch circuit to be electrically connected to different pattern matching circuits to detect a received signal strength indication value for each channel within a preset channel range through the antenna electrically connected with different pattern matching circuits. When the wireless chip determines that a detection result generated by the antenna electrically connected to a currently connected pattern matching circuit meets a default condition, the radio frequency switch circuit maintains electrical connection with the currently connected pattern matching circuit. Therefore, the anti-interference ability is improved.

14 Claims, 5 Drawing Sheets

WIRELESS EARSET

CROSS REFERENCE TO RELATED APPLICATION

This application claims the priority benefit of Chinese Patent Application Serial Number 202210605992.5, filed on May 31, 2022, the full disclosure of which is incorporated herein by reference.

BACKGROUND

Technical Field

The present disclosure relates to the field of communication technologies, and in particular, to a wireless earset.

Related Art

As a wireless earset is becoming more and more popular in the market, people have higher and higher requirements for the appearance design and function of the wireless earset. The appearance design of the wireless earset must be small enough to be easily worn by the user. However, the more functional requirements for the wireless earset, the more electronic devices need to be added to the wireless earset, which squeeze the space where an antenna can be disposed, so that the design of the antenna is limited, resulting in poor OTA test performance and poor radiation pattern of the antenna, which causes the problem of poor user experience.

In addition, the area of the circuit board used in the miniaturized wireless earset is small and is about 2.0 square centimeters or less, which causes (1) the switch mode power supply (SMPS) that generate high-order harmonic noise to be too close to the radio frequency (RF) transceiver with high sensitivity; (2) suboptimal component placement and layout; (3) various radiation sources, such as chips, Flashes, quartz crystal resonators to generate crosstalk, resulting in more serious problems of intermittent sound and lagging during use of the wireless earset.

In view of this, the relevant industry proposes to implement the hardware automatic power control (HWAPC) or software automatic power control (SWAPC) strategy through the chip, or adjust the delay between the master device and the slave device to improve the anti-interference ability of the wireless earset, but the effect is not obvious.

Therefore, how to provide a wireless earset with better anti-interference ability to improve user experience is an urgent problem to be solved.

SUMMARY

The present disclosure provides a wireless earset, which can solve the problem of poor anti-interference ability of the wireless earset in the prior art, resulting in poor user experience.

In order to solve the above technical problem, the present disclosure is implemented as follows.

The present disclosure provides a wireless earset, including an antenna, a plurality of pattern matching circuits, a radio frequency switch circuit, a wireless chip, a port matching circuit, an antenna matching circuit, a circuit board, a feeding connector and a grounding connector. The plurality of pattern matching circuits are connected to the antenna respectively, and each pattern matching circuit is configured to have an impedance that matches an impedance of the antenna. The radio frequency switch circuit is configured to electrically connect to one of the plurality of pattern matching circuits based on a control signal, and ground a pattern matching circuit electrically connected to the radio frequency switch circuit. The circuit board includes a feed point and a ground point. The feeding connector is electrically connected to the antenna and the feeding point to feed the antenna. The ground connector is electrically connected to the antenna and the ground point. The port matching circuit is electrically connected to the wireless chip, and is configured to have an impedance that matches an impedance of the wireless chip. The antenna matching circuit is electrically connected to the port matching circuit and the antenna, and is configured to have an impedance that matches the impedance of the antenna. The wireless chip is electrically connected to the radio frequency switch circuit, and is configured to output different control signals to control the radio frequency switch circuit to be electrically connected to the different pattern matching circuits after the wireless earset is activated, so as to detect a received signal strength indication (RSSI) value for each channel within a preset channel range by the antenna electrically connected to the different pattern matching circuits, and then determine whether a detection result generated by the antenna being electrically connected to a currently connected pattern matching circuit meets a default condition. When the wireless chip determines that the detection result meets the default condition, the radio frequency switch circuit maintains electrical connection with the currently connected pattern matching circuit.

In the embodiment of the present disclosure, through the configuration of the radio frequency switch circuit, the antenna can be electrically connected with different pattern matching circuits respectively, so as to realize different antenna patterns (i.e., different radiation patterns), which are suitable for use in the miniaturized wireless earset and improve the competitiveness of the wireless earset. In addition, the wireless chip detects the RSSI value for each channel within the preset channel range, checks the strength of the interference signal in the surrounding environment, and then switches between different antenna patterns to enhance the ability of the antenna to send and receive signals, attenuate the influence of external in-band and out-of-band interference on antenna performance, and improve the anti-interference ability of the wireless earset, thereby improving the user experience. Besides, through the configurations of the port matching circuit and the antenna matching circuit, the impedance of the antenna matches the impedance of the wireless chip, which can avoid the signal reflection between the antenna and the wireless chip, thereby preventing the distortion of the signal waveform.

BRIEF DESCRIPTION OF THE DRAWINGS

The features of the exemplary embodiments believed to be novel and the elements and/or the steps characteristic of the exemplary embodiments are set forth with particularity in the appended claims. The Figures are for illustration purposes only and are not drawn to scale. The exemplary embodiments, both as to organization and method of operation, may best be understood by reference to the detailed description which follows taken in conjunction with the accompanying drawings in which:

DETAILED DESCRIPTION OF THE EMBODIMENTS

The following embodiments describe the features and advantages of the present disclosure in detail, but do not limit the scope of the present disclosure in any point of view. According to the description, claims, and drawings, a person ordinarily skilled in the art can easily understand the technical content of the present disclosure and implement it accordingly.

The embodiments of the present disclosure will be described below in conjunction with the relevant drawings. In the figures, the same reference numbers refer to the same or similar components or method flows.

It must be understood that the words "including", "comprising" and the like used in this specification are used to indicate the existence of specific technical features, values, method steps, work processes, elements and/or components. However, it does not exclude that more technical features, values, method steps, work processes, elements, components, or any combination of the above can be added.

It must be understood that when an element is described as being "connected" or "coupled" to another element, it may be directly connected or coupled to another element, and intermediate elements therebetween may be present. In contrast, when an element is described as being "directly connected" or "directly coupled" to another element, there is no intervening element therebetween.

Figure 1:
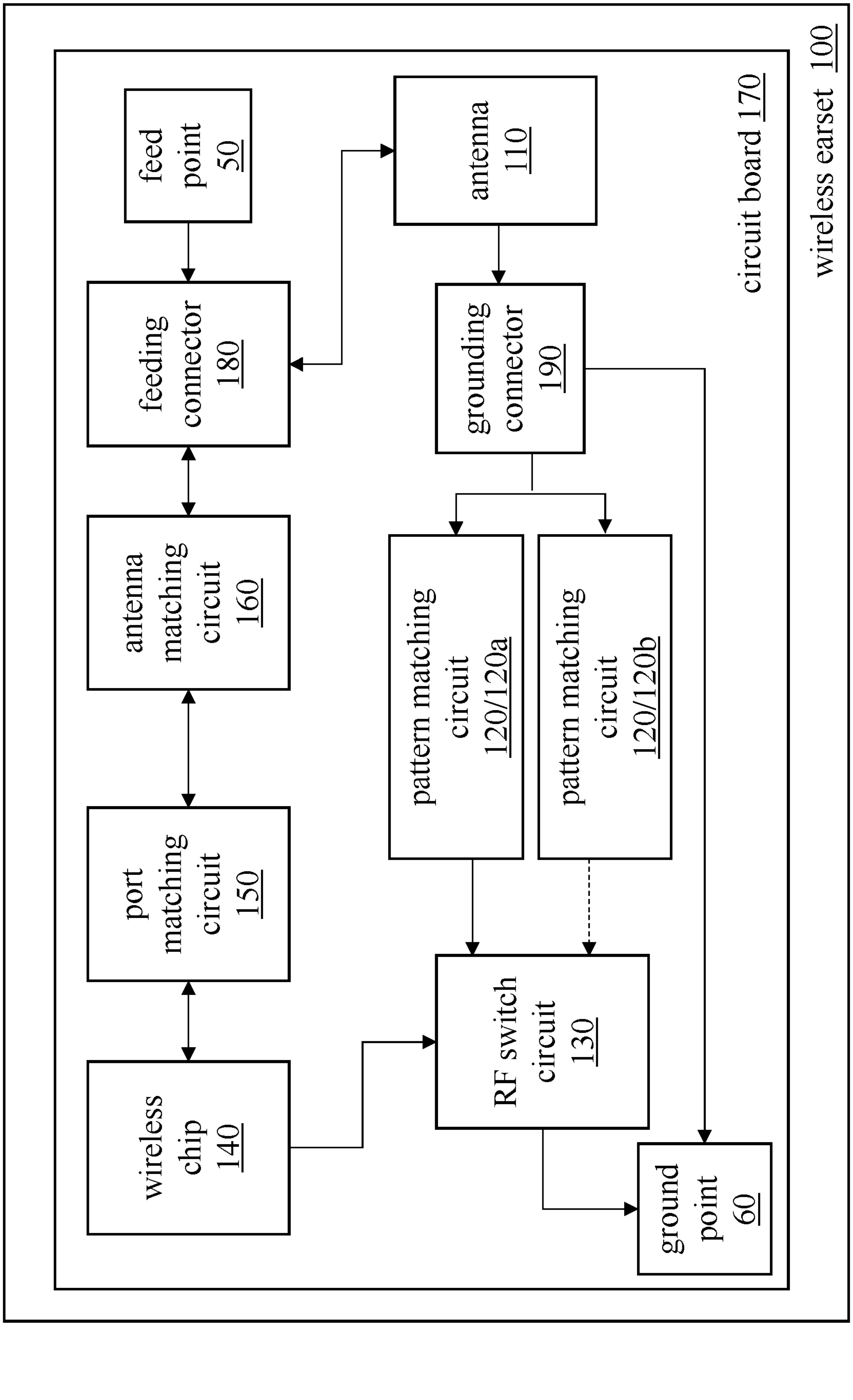
FIG. 1 is a block diagram of a wireless earset according to a first embodiment of the present disclosure.

Please refer to FIG. 1, which is a block diagram of a wireless earset according to a first embodiment of the present disclosure. As shown in FIG. 1, the wireless earset 100 comprises an antenna 110, a plurality of pattern matching circuits 120, a radio frequency (RF) switch circuit 130, a wireless chip 140, a port matching circuit 150, an antenna matching circuit 160, a circuit board 170, a feeding connector 180 and a grounding connector 190. The plurality of pattern matching circuits 120 are connected to the antenna 110 respectively, the RF switch circuit 130 is selectively electrically connected to one of the plurality of pattern matching circuits 120, the wireless chip 140 is electrically connected to the RF switch circuit 130, the port matching circuit 150 is electrically connected to the wireless chip 140, and the antenna matching circuit 160 is electrically connected to the port matching circuit 150 and the antenna 110. The circuit board 170 comprises a feed point 50 and a ground point 60, the feeding connector 180 is electrically connected to the antenna 110, the antenna matching circuit 160 and the feed point 50, and the ground connector 190 is electrically connected to the antenna 110 and the ground point 60.

In this embodiment, the number of pattern matching circuits 120 may be, but not limited to, two (i.e., the pattern matching circuits 120*a* and the pattern matching circuit 120*b*). The actual number of pattern matching circuits 120 may be adjusted according to requirements such as the size of layout space and the number of antenna patterns corresponding to the number of pattern matching circuits 120. In addition, the antenna 110, the plurality of pattern matching circuits 120, the RF switch circuit 130, the wireless chip 140, the port matching circuit 150, the antenna matching circuit 160, the feeding connector 180 and the grounding connector 190 may all be disposed on the circuit board 170.

In actual implementation, the wireless earset 100 may be but not limited to a true wireless stereo (TWS) earset; the antenna 110 may be but not limited to a single-stage antenna, an inverted-F antenna (IFA), a ceramic antenna, a printed circuit board (PCB) antenna, a flexible printed circuit (FPC) antenna, a steel sheet antenna or a laser direct structuring (LDS) antenna; the RF switch circuit 130 may be implemented by but not limited to analog circuits, integrated circuits (ICs), digital circuits and other devices to achieve its functions; the wireless chip 140 may be but not limited to a Bluetooth chip; the circuit board 170 may be but not limited to a printed circuit board; and each of the feeding connector 180 and the grounding connector 190 may be an elastic piece or a pogo pin respectively.

The port matching circuit 150 is configured to have an impedance that matches an impedance of the wireless chip 140, and the antenna matching circuit 160 is configured to have an impedance that matches an impedance of the antenna 110, so that the impedance of the antenna 110 matches the impedance of the wireless chip 140 through the configurations of the port matching circuit 150 and the antenna matching circuit 160 in the wireless earset 100, which can avoid the signal reflection between the antenna 110 and the wireless chip 140, thereby preventing the distortion of the signal waveform.

Each of the plurality of pattern matching circuits 120 (i.e., the pattern matching circuit 120*a* and the pattern matching circuit 120*b*) is configured to have an impedance that matches the impedance of the antenna 110 respectively, and the RF switch circuit 130 is configured to be electrically connected to one of the plurality of pattern matching circuits 120 (i.e., the pattern matching circuit 120*a* or the pattern matching circuit 120*b*) based on a control signal, and ground a pattern matching circuit 120 electrically connected to the RF switch circuit 130. That is, the antenna 110 is connected to the ground point 60 through the RF switch circuit 130 and its electrically connected pattern matching circuit 120. In addition, the feeding connector 180 is configured to feed the antenna 110, and the grounding connector 190 is configured to ground the antenna 110. Therefore, the antenna 110 may be electrically connected to different pattern matching circuits 120 through the RF switch circuit 130 to realize different antenna patterns, wherein the antenna pattern refers to the radiation pattern.

That is to say, after the wireless earset 100 is activated (i.e., the wireless earset 100 is powered on, or the wireless earset 100 is powered on and inserted in or worn on the user's ear), the wireless chip 140 controls the RF switch circuit 130 to electrically connect to one of the plurality of pattern matching circuits 120 (i.e., the pattern matching circuit 120*a* or the pattern matching circuit 120*b*) through the output control signal to sends and receives radio frequency signals through the antenna 110 electrically connected to the pattern matching circuit 120*a* or the pattern matching circuit 120*b*.

For example, when the wireless chip 140 controls the RF switch circuit 130 to be electrically connected to the pattern matching circuit 120*a*, the antenna 110 can convert the radio frequency signal output by the wireless chip 140 into electromagnetic waves, and radiate the electromagnetic waves based on the radiation pattern generated by the electrical connection with the pattern matching circuit 120*a*, wherein the radio frequency signal output by the wireless chip 140 is sequentially transmitted through the port matching circuit 150, the antenna matching circuit 160, the feeding connector 180, the antenna 110, the grounding connector 190, the pattern matching circuit 120*a* and the RF switch circuit 130, and then grounded. The antenna 110 can receive electromagnetic waves in the space based on the radiation pattern generated by the electrical connection with the pattern matching circuit 120*a*, and convert the electromagnetic waves into the radio frequency signal and transmit it to the wireless chip 140, wherein the radio frequency signal received by the antenna 110 is transmitted to the wireless chip 140 through the feed connector 180, the antenna matching circuit 160 and the port matching circuit 150 in sequence. When the wireless chip 140 controls the RF switch circuit 130 to be electrically connected to the pattern matching circuit 120*b*, the antenna 110 can convert the radio frequency signal output by the wireless chip 140 into electromagnetic waves, and radiate the electromagnetic waves based on the radiation pattern generated by the electrical connection with the pattern matching circuit 120*b*, wherein the radio frequency signal output by the wireless chip 140 is sequentially transmitted through the port matching circuit 150, the antenna matching circuit 160, the feeding connector 180, the antenna 110, the grounding connector 190, the pattern matching circuit 120*a* and the RF switch circuit 130, and then grounded. The antenna 110 can receive electromagnetic waves in the space based on the radiation pattern generated by the electrical connection with the pattern matching circuit 120*b*, and convert the electromagnetic waves into the radio frequency signal and transmit it to the wireless chip 140, wherein the radio frequency signal received by the antenna 110 is transmitted to the wireless chip 140 through the feed connector 180, the antenna matching circuit 160 and the port matching circuit 150 in sequence.

Therefore, in order to improve the anti-interference ability of the wireless earset 100 and ensure that the sound interruption and jamming do not happen in the wireless earset 100, the wireless chip 140 can output different control signals corresponding to the plurality of pattern matching circuits 120 in a one-to-one corresponding manner to control the RF switch circuits 130 to be electrically connected to the different pattern matching circuits 120 respectively (i.e., the wireless chip 140 outputs different control signals to control the RF switch circuit 130 to be electrically connected to the different pattern matching circuits 120), so as to detect a RSSI value for each channel within a preset channel range by the antenna 110 electrically connected to the different pattern matching circuits 120, and then determine whether a detection result including the RSSI value for each channel within the preset channel range and generated by the antenna 110 being electrically connected to a currently connected pattern matching circuit 120 meets a default condition. When wireless chip 140 determines that the detection result meets the default condition, the RF switch circuit 130 maintains electrical connection with the currently connected pattern matching circuit 120, so that the antenna 110 can send and receive RF signals when there are enough available channels.

In an example, the default condition may be, but not limited to, the number of channels whose RSSI value is less than a preset RSSI value is greater than or equal to a preset threshold, wherein the channel whose RSSI value is less than the preset RSSI value can be regarded as an available channel; the channel whose RSSI value is greater than or equal to the preset RSSI value can be regarded as a unavailable channel; the preset channel range may be but not limited to 124 channels in the PGSM band, 49 channels in the EGSM band, 374 channels in the DCS band, or 124 channels in the GSM850 band; the preset RSSI value may be but not limited to −30 dBm; the preset threshold may be but not limited to 20; and the preset channel range, the preset RSSI value and the preset threshold can be adjusted according to actual needs.

In one embodiment, the wireless chip 140 may be further configured to store detection results generated by the antenna 110 being electrically connected to the different pattern matching circuits 120. When each of the detection results generated by the antenna 110 electrically connected to the different pattern matching circuits 120 does not meet a default condition (that is, no matter which pattern matching circuit 120 the antenna 110 is electrically connected to, there is not enough available channel for sending and receiving radio frequency signals), the wireless chip 140 selects the control signal corresponding to the detection result with the largest number of channels whose RSSI value is less than a preset RSSI value to control the RF switch circuit 130, so that the antenna 110 can send and receive radio frequency signals under a relatively good communication condition, and the RF switch circuit 130 can be prevented from falling into an endless loop of constantly switching and connecting to different pattern matching circuits 120 because all the detection results do not meet the default condition.

Therefore, after the wireless earset 100 of this embodiment is activated, the wireless chip 140 can output a first control signal to control the RF switch circuit 130 to be electrically connected to the pattern matching circuit 120*a*, so as to detect the RSSI value for each channel within the preset channel range through the antenna 110 electrically connected to the pattern matching circuit 120*a*, and determine whether the detection result including the RSSI value of each channel within the preset channel range meets the default condition, wherein the default condition may be that the number of channels whose RSSI value is less than the preset RSSI value is greater than or equal to the preset threshold. If it is determined that the detection result meets the default condition, the RF switch circuit 130 maintains electrical connection with the currently connected pattern matching circuit 120*a*. If it is determined that the detection result does not meet the default condition, the wireless chip 140 outputs a second control signal to control the RF switch circuit 130 to be electrically connected to the pattern matching circuit 120*b*, so as to detect the RSSI value for each channel within the preset channel range through the antenna 110 electrically connected to the pattern matching circuit 120*b*, and determine whether the detection result including the RSSI value of each channel within the preset channel range meets the default condition. If it is determined that the detection result meets the default condition, the RF switch circuit 130 maintains electrical connection with the currently connected pattern matching circuit 120*b*. If it is determined that the detection result does not meet the default condition, the wireless chip 140 selects the control signal corresponding to the detection result with the largest number of channels whose RSSI value is less than a preset RSSI value to control the RF switch circuit 130, so that the antenna 110 can send and receive radio frequency signals under a relatively good communication condition.

It is worth noting that, in this embodiment, the process executed by the wireless chip 140 comprises: outputting the first control signal, detecting the RSSI value for each channel within the preset channel range through the antenna 110 electrically connected to the pattern matching circuit 120*a*, determining whether the detection result meets the default condition, outputting the second control signal, detecting the RSSI value for each channel within the preset channel range through the antenna 110 electrically connected to the pattern matching circuit 120*b*, determining that the RF switch circuit 130 maintains electrical connection with the currently connected pattern matching circuit 120*b*, and making the antenna 110 operate in the frequency hopping mode, and the overall time of the process may be but not limited to 200 milliseconds (ms). Therefore, the user experience does not be affected, and the actual length of the overall time may be set or adjusted according to requirements.

Figure 2:
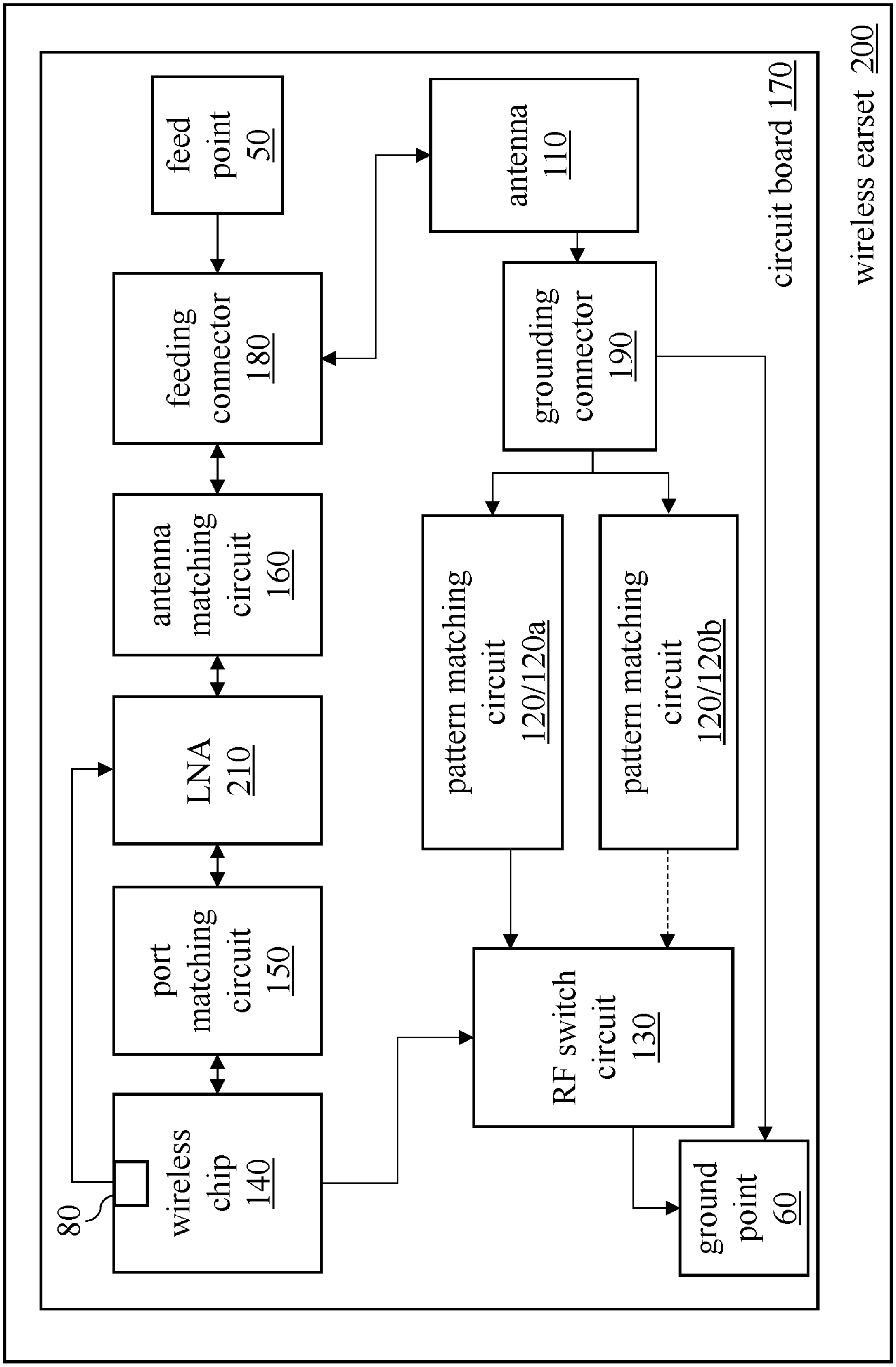
FIG. 2 is a block diagram of a wireless earset according to a second embodiment of the present disclosure.

Please refer to FIG. 2, which is a block diagram of the wireless earset according to a second embodiment of the present disclosure. As shown in FIG. 2, the difference between the wireless earset 200 and the wireless earset 100 is that the wireless earset 200 may further comprise a low-noise amplifier (LNA) 210 disposed between the port matching circuit 150 and the antenna matching circuit 160, and the low-noise amplifier 210 may be configured to perform a low-noise amplification processing on the radio frequency signal received by the antenna 110 and the radio frequency signal output by the wireless chip 140. The noise figure of the low-noise amplifier 210 is very low, and the low-noise amplifier 210 can amplify the radio frequency signal received by the antenna 110 and the radio frequency signal output by the wireless chip 140, and reduce the noise signal at the same time, which can improve the signal-to-noise ratio of the radio frequency signal received by the antenna 110 and the signal-to-noise ratio of the radio frequency signal output by the wireless chip 140, thereby improving the sensitivity of the wireless earset 200.

In one embodiment, the wireless chip 140 may comprise a low-noise amplification control pin 80 connected to the low-noise amplifier 210, and the wireless chip 140 enables the low-noise amplifier 210 by the low-noise amplification control pin 80.

Figure 3:
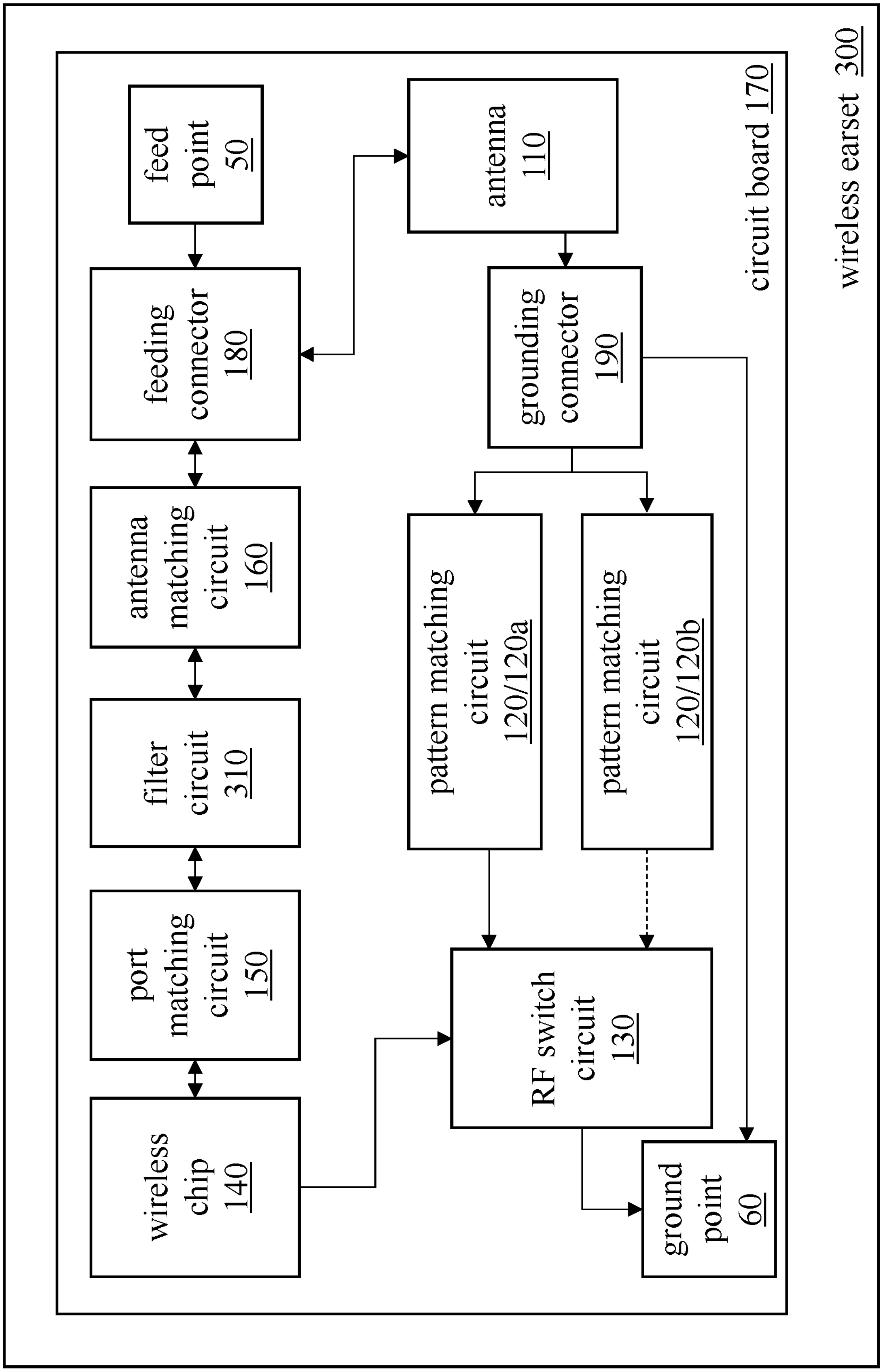
FIG. 3 is a block diagram of a wireless earset according to a third embodiment of the present disclosure.

Please refer to FIG. 3, which is a block diagram of the wireless earset according to a third embodiment of the present disclosure. As shown in FIG. 3, the difference between the wireless earset 300 and the wireless earset 100 is that the wireless earset 300 may further comprise a filter circuit 310 disposed between the port matching circuit 150 and the antenna matching circuit 160, and the filter circuit 310 may be configured to perform a filtering processing on the radio frequency signal received by the antenna 110 and the radio frequency signal output by the wireless chip 140. The filter circuit 310 can effectively filter out a specific frequency or frequencies other than the specific frequency to obtain a radio frequency signal with a certain frequency.

Figure 4:
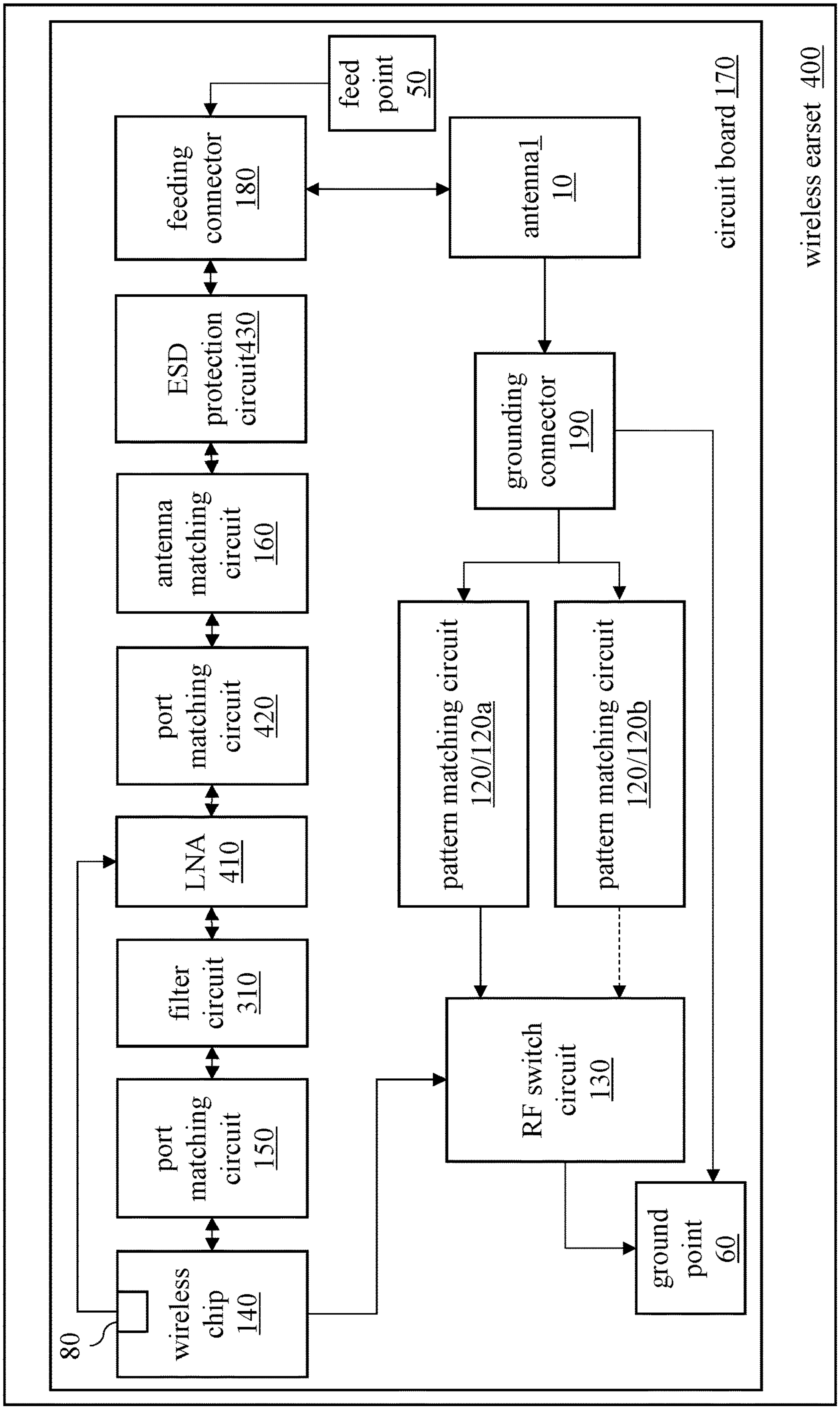
FIG. 4 is a block diagram of a wireless earset according to a fourth embodiment of the present disclosure.

Please refer to FIG. 4, which is a block diagram of a wireless earset according to a fourth embodiment of the present disclosure. As shown in FIG. 4, the difference between the wireless earset 400 and the wireless earset 300 is that the wireless earset 400 may further comprise a low-noise amplifier 410 disposed between the filter circuit 310 and the antenna matching circuit 160, and the low-noise amplifier 410 may be configured to perform a low-noise amplification processing on the radio frequency signal processed by the filter circuit 310. In one example, the wireless chip 140 enables the low-noise amplifier 410 by the low-noise amplification control pin 80.

In one embodiment, the wireless earset 400 may further comprise another port matching circuit 420 disposed between the low-noise amplifier 410 and the antenna matching circuit 160, and the port matching circuit 420 is configured to perform an impedance matching between the low-noise amplifier 410 and the antenna matching circuit 160.

In one embodiment, the wireless earset 400 may further comprise an electrostatic discharge (ESD) protection circuit 430, the electrostatic discharge protection circuit 430 is connected to the feeding connector 180 and the antenna matching circuit 160, and the electrostatic discharge protection circuit 430 is configured to provide electrostatic discharge protection for the antenna matching circuit 160.

Figure 5:
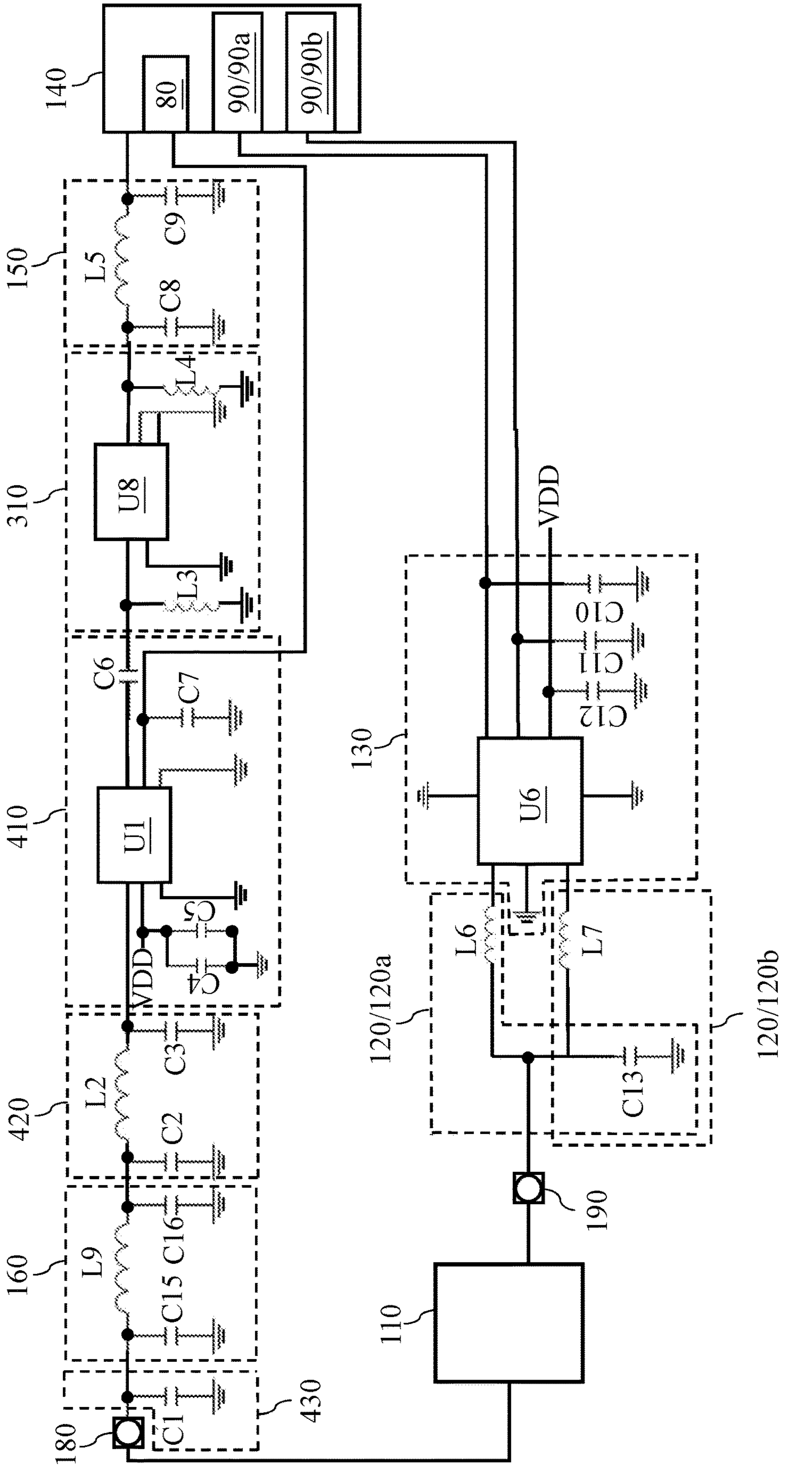
FIG. 5 is a schematic circuit diagram of an embodiment of the wireless earset of FIG. 4.

Please refer to FIG. 5, which is a schematic circuit diagram of an embodiment of the wireless earset of FIG. 4. As shown in FIG. 5, the wireless chip 140 may comprise a plurality of pattern control pins 90, and the wireless chip 140 outputs different control signals through the plurality of pattern control pins 90. In this embodiment, the number of pattern control pins 90 may be, but not limited to, two (i.e., the pattern control pin 90*a* and the pattern control pin 90*b*). When the voltages of the pattern control pin 90*a* and the low-noise amplification control pin 80 are set at high level, and the voltage of the pattern control pin 90*b* is set at low level, the wireless chip 140 outputs the first control signal to control the RF switch circuit 130 to be electrically connected to the pattern matching circuit 120*a*, and enables the low-noise amplifier 410. When the voltages of the pattern control pin 90*a* and the low-noise amplification control pin 80 are set at low level, and the voltage of the pattern control pin 90*b* is set at high level, the wireless chip 140 outputs the second control signal to control the RF switch circuit 130 to be electrically connected to the pattern matching circuit 120*b*, and enables the low-noise amplifier 410. This embodiment is not intended to limit the present disclosure, and the number of pattern control pins 90 can be designed according to actual needs.

In this embodiment, the antenna matching circuit 160, the port matching circuit 150 and the port matching circuit 420 may be it-type matching circuits respectively, which is beneficial to adjust the impedance to be close to 50 ohms, so that the radio frequency signal can be transmitted out with the maximum energy. The antenna matching circuit 160 may be composed of a capacitor C15, a capacitor C16 and an inductor L9, the port matching circuit 150 may be composed of a capacitor C8, a capacitor C9 and an inductor L5, and the port matching circuit 420 may be composed of a capacitor C2, a capacitor C3 and an inductor L2.

In this embodiment, the RF switch circuit 130 may be composed of a capacitor C10, a capacitor C11, a capacitor C12, and a RF switch chip U6, wherein the RF switch chip U6 may be a single-pole double-throw (SPDT) switch or a single-pole multi-throw switch (SPnT) to realize its function.

In this embodiment, the pattern matching circuit 120*a* and the pattern matching circuit 120*b* may be L-type matching circuits respectively, and share a capacitor C13, which is beneficial to adjust the impedance to be close to 50 ohms, so that the radio frequency signal can be transmitted out with the maximum energy. The pattern matching circuit 120*a* may be composed of an inductor L6 and a capacitor C13, and the pattern matching circuit 120*b* may be composed of an inductor L7 and the capacitor C13.

In this embodiment, the low-noise amplifier 410 may be composed of capacitors C6, C7, C4, C5 and a RF low-noise amplifier chip U1, the filter circuit 310 may be composed of an inductor L3, an inductor L4 and a filter chip U8, and the electrostatic discharge protection circuit 430 may comprise a capacitor C1.

To sum up, in the embodiments of the present disclosure, through the configuration of the radio frequency switch circuit, the antenna can be electrically connected with different pattern matching circuits respectively, so as to realize different antenna patterns (i.e., different radiation patterns), which are suitable for use in the miniaturized wireless earset and improve the competitiveness of the wireless earset. In addition, the wireless chip detects the RSSI value for each channel within the preset channel range, checks the strength of the interference signal in the surrounding environment, and then switches between different antenna patterns to enhance the ability of the antenna to send and receive signals, attenuate the influence of external in-band and out-of-band interference on antenna performance, and improve the anti-interference ability of the wireless earset, thereby improving the user experience. Besides, through the configurations of the port matching circuit and the antenna matching circuit, the impedance of the antenna matches the impedance of the wireless chip, which can avoid the signal reflection between the antenna and the wireless chip, thereby preventing the distortion of the signal waveform.

Although the present disclosure is disclosed in the foregoing embodiments, it is not intended to limit the present disclosure. Changes and modifications made without departing from the spirit and scope of the present disclosure belong to the scope of the claims of the present disclosure. The scope of protection of the present disclosure should be construed based on the following claims.

What is claimed is:

1. A wireless earset, comprising:

an antenna;

a plurality of pattern matching circuits connected to the antenna respectively, wherein each pattern matching circuit is configured to have an impedance that matches an impedance of the antenna;

a radio frequency switch circuit configured to electrically connect to one of the plurality of pattern matching circuits based on a control signal, and ground a pattern matching circuit electrically connected to the radio frequency switch circuit;

a circuit board comprising a feed point and a ground point;

a feeding connector electrically connected to the antenna and the feeding point to feed the antenna;

a grounding connector electrically connected to the antenna and the ground point;

a wireless chip electrically connected to the radio frequency switch circuit, and configured to output different control signals to control the radio frequency switch circuit to be electrically connected to the different pattern matching circuits after the wireless earset is activated, so as to detect a received signal strength indication (RSSI) value for each channel within a preset channel range by the antenna electrically connected to the different pattern matching circuits, and then determine whether a detection result generated by the antenna being electrically connected to a currently connected pattern matching circuit meets a default condition, wherein when the wireless chip determines that the detection result meets the default condition, the radio frequency switch circuit maintains electrical connection with the currently connected pattern matching circuit;

a port matching circuit electrically connected to the wireless chip, and configured to have an impedance that matches an impedance of the wireless chip; and an antenna matching circuit electrically connected to the port matching circuit, the feeding connector and the antenna, and configured to have an impedance that matches the impedance of the antenna.

2. The wireless earset according to claim 1, wherein the default condition is that the number of channels whose RSSI value is less than a preset RSSI value is greater than or equal to a preset threshold.

3. The wireless earset according to claim 1, wherein the wireless chip is further configured to store detection results generated by the antenna being electrically connected to the different pattern matching circuits; when each of the detection results generated by the antenna electrically connected to the different pattern matching circuits does not meet the default condition, the wireless chip selects a control signal corresponding to a detection result with the largest number of channels whose RSSI value is less than a preset RSSI value to control the radio frequency switch circuit.

4. The wireless earset according to claim 1, wherein each of the feeding connector and the grounding connector is an elastic piece or a pogo pin respectively.

5. The wireless earset according to claim 1, wherein the wireless chip comprises a plurality of pattern control pins, and the wireless chip outputs the different control signals through the plurality of pattern control pins.

6. The wireless earset according to claim 1, further comprising: a low-noise amplifier disposed between the port matching circuit and the antenna matching circuit, and configured to perform a low-noise amplification processing on a radio frequency signal received by the antenna and a radio frequency signal output by the wireless chip.

7. The wireless earset according to claim 6, wherein the wireless chip comprises a low-noise amplification control pin connected to the low-noise amplifier, and the wireless chip enables the low noise amplifier by the low-noise amplification control pin.

8. The wireless earset according to claim 1, further comprising: a filter circuit disposed between the port matching circuit and the antenna matching circuit, and configured to perform a filtering processing on a radio frequency signal received by the antenna and a radio frequency signal output by the wireless chip.

9. The wireless earset according to claim 8, further comprising: a low-noise amplifier disposed between the filter circuit and the antenna matching circuit, and configured to perform a low-noise amplification processing on the radio frequency signal processed by the filter circuit.

10. The wireless earset according to claim 9, wherein the wireless chip comprises a low-noise amplification control pin connected to the low-noise amplifier, and the wireless chip enables the low noise amplifier by the low-noise amplification control pin.

11. The wireless earset according to claim 9, further comprising: another port matching circuit disposed between the low noise amplifier and the antenna matching circuit, and configured to perform an impedance matching between the low-noise amplifier and the antenna matching circuit.

12. The wireless earset according to claim 1, further comprising: an electrostatic discharge protection circuit connected to the feeding connector and the antenna matching circuit, and configured to provide electrostatic discharge protection for the antenna matching circuit.

13. The wireless earset according to claim 1, wherein the antenna matching circuit and the port matching circuit are it-type matching circuits respectively.

14. The wireless earset according to claim 1, wherein the plurality of pattern matching circuits are L-type matching circuits and share a capacitor.

* * * * *